(12) United States Patent
Durdevic et al.

(10) Patent No.: US 10,703,436 B2
(45) Date of Patent: Jul. 7, 2020

(54) REMOTE CONTROL UNIT AND ELECTRIC BICYCLE

(71) Applicant: BIKETEC AG, Huttwil (CH)

(72) Inventors: Ivica Durdevic, Huttwil (CH); Lukas Beat Studer, Neuendorf (CH); Philipp Walter Suter, Emmen (CH); Simon Lanz, Gondiswil (CH); Robin Woodtli, Solothurn (CH); Timo Woelk, Fischbachau (DE); Omar Afzal, Munich (DE)

(73) Assignee: BIKETEC AG, Huttwil (CH)

( * ) Notice: Subject to any disclaimer, the term of this patent is extended or adjusted under 35 U.S.C. 154(b) by 0 days.

(21) Appl. No.: 15/905,191

(22) Filed: Feb. 26, 2018

(65) Prior Publication Data

US 2018/0251180 A1    Sep. 6, 2018

Related U.S. Application Data

(63) Continuation of application No. PCT/EP2016/070085, filed on Aug. 25, 2016.

(30) Foreign Application Priority Data

Aug. 25, 2015 (DE) .................. 10 2015 216 178
Aug. 25, 2015 (DE) .................. 10 2015 216 186
Aug. 25, 2015 (DE) .................. 10 2015 216 188

(51) Int. Cl.
*B62J 3/00* (2020.01)
*B62M 6/55* (2010.01)
(Continued)

(52) U.S. Cl.
CPC .............. *B62M 6/55* (2013.01); *B60K 35/00* (2013.01); *B62J 99/00* (2013.01); *B62K 19/30* (2013.01);
(Continued)

(58) Field of Classification Search
CPC . B62M 6/55; B62M 6/45; B62M 6/50; B62M 25/08; B62M 2005/003;
(Continued)

(56) References Cited

U.S. PATENT DOCUMENTS

| | | | |
|---|---|---|---|
| 5,789,702 A | 8/1998 | Perella | |
| 6,204,752 B1 | 3/2001 | Kishimoto | |

(Continued)

FOREIGN PATENT DOCUMENTS

| | | | |
|---|---|---|---|
| CN | 1343598 A | 4/2002 | |
| CN | 1443686 A | 9/2003 | |

(Continued)

OTHER PUBLICATIONS

German Office Action for Application No. 10 2015 216 178.1 dated May 17, 2016.
(Continued)

*Primary Examiner* — Zhen Y Wu
(74) *Attorney, Agent, or Firm* — Jenkins, Wilson, Taylor & Hunt, P.A.

(57) ABSTRACT

A remote control unit for a display unit of an electric bicycle, the remote control unit being situated in the region of a handlebar grip remote from display unit and having assistance selection keys for the selection of the assistance level and having at least one input device for the menu navigation and selection of menu items shown on display unit. Input unit and assistance selection keys together are situated along a common line. Furthermore disclosed is an electric bicycle including such a remote control unit.

12 Claims, 6 Drawing Sheets

(51) Int. Cl.
  *B62M 6/50*   (2010.01)
  *B62K 23/06*  (2006.01)
  *B62K 19/30*  (2006.01)
  *B62K 23/02*  (2006.01)
  *B62M 6/45*   (2010.01)
  *B62K 19/40*  (2006.01)
  *B60K 35/00*  (2006.01)
  *B62J 99/00*  (2020.01)
  *B62M 25/08*  (2006.01)
  *G06F 3/02*   (2006.01)
  *B62J 50/21*  (2020.01)
  *B62M 25/00*  (2006.01)
  *B62K 21/12*  (2006.01)

(52) U.S. Cl.
  CPC .............. *B62K 19/40* (2013.01); *B62K 23/02* (2013.01); *B62K 23/06* (2013.01); *B62M 6/45* (2013.01); *B62M 6/50* (2013.01); *B62M 25/08* (2013.01); *G06F 3/02* (2013.01); *B62J 50/225* (2020.02); *B62K 21/12* (2013.01); *B62K 2204/00* (2013.01); *B62M 2025/003* (2013.01)

(58) Field of Classification Search
  CPC .... B60K 35/00; B60K 21/12; B60K 2204/00; B62J 99/00; B62J 2099/0033; B62K 19/30; B62K 19/40; B62K 23/02; B62K 23/06; G06F 3/02
  USPC .......................................................... 340/432
  See application file for complete search history.

(56) References Cited

U.S. PATENT DOCUMENTS

| | | | |
|---|---|---|---|
| 6,400,564 B1* | 6/2002 | Nishimoto | B62J 99/00 188/24.11 |
| 6,401,997 B1 | 6/2002 | Smerdon, Jr. | |
| 6,584,872 B1* | 7/2003 | Kojima | B62K 21/125 74/551.8 |
| 6,682,087 B1* | 1/2004 | Takeda | B62J 99/00 280/238 |
| 7,976,048 B2* | 7/2011 | Bartolome Garcia | B62J 11/00 224/412 |
| 8,469,381 B2 | 6/2013 | Dodman et al. | |
| 8,525,793 B2* | 9/2013 | Sentchenkoff | B60K 35/00 345/168 |
| 8,857,550 B2* | 10/2014 | Kim | B62K 3/10 180/206.2 |
| 8,979,111 B2 | 3/2015 | Dal Pozzo | |
| 9,150,272 B1 | 10/2015 | Thompson | |
| 9,287,063 B2 | 3/2016 | Mueller et al. | |
| 9,483,133 B2* | 11/2016 | Gondo | G06F 3/016 |
| 10,647,381 B2 | 5/2020 | Durdevic et al. | |
| 2001/0039850 A1 | 11/2001 | Masui et al. | |
| 2001/0040204 A1* | 11/2001 | Irie | B62J 99/00 248/230.1 |
| 2002/0079211 A1* | 6/2002 | Katayama | H01H 3/125 200/517 |
| 2004/0039522 A1 | 2/2004 | Jwo | |
| 2004/0239489 A1* | 12/2004 | Takeda | B62J 99/00 340/432 |
| 2005/0204854 A1* | 9/2005 | McLaughlin | B62M 25/04 74/502.2 |
| 2005/0280244 A1* | 12/2005 | Watarai | B62J 11/00 280/288.4 |
| 2006/0186631 A1* | 8/2006 | Ishikawa | B62M 25/08 280/260 |
| 2008/0180233 A1* | 7/2008 | Miglioranza | A45F 5/102 340/432 |
| 2008/0298613 A1* | 12/2008 | Slamka | H04M 1/05 381/311 |
| 2008/0312799 A1* | 12/2008 | Miglioranza | B62M 9/122 701/66 |
| 2009/0002198 A1* | 1/2009 | Bach | H01Q 1/44 341/20 |
| 2009/0107825 A1* | 4/2009 | Chou | H01H 25/041 200/5 B |
| 2009/0170660 A1 | 7/2009 | Miglioranza | |
| 2010/0237120 A1* | 9/2010 | Muhlberger | B62J 11/00 224/562 |
| 2011/0267178 A1* | 11/2011 | Nishihara | B62K 23/02 340/12.39 |
| 2012/0049483 A1* | 3/2012 | Dodman | B62M 6/55 280/281.1 |
| 2012/0159328 A1 | 6/2012 | Millington et al. | |
| 2012/0221205 A1* | 8/2012 | Ichida | B62J 99/00 701/37 |
| 2012/0228107 A1* | 9/2012 | Funakoshi | H01H 3/125 200/532 |
| 2012/0316710 A1 | 12/2012 | Saida | |
| 2013/0054068 A1* | 2/2013 | Shoge | B62M 6/45 701/22 |
| 2013/0228424 A1* | 9/2013 | Beck | H01H 23/10 200/3 |
| 2013/0257609 A1* | 10/2013 | Otsuji | B62J 99/00 340/441 |
| 2013/0334874 A1 | 12/2013 | Shirai | |
| 2014/0080661 A1 | 3/2014 | Paick et al. | |
| 2014/0216198 A1* | 8/2014 | Kariyama | F16C 1/226 74/502.6 |
| 2014/0252746 A1* | 9/2014 | Talavasek | B62K 21/12 280/288.4 |
| 2014/0353134 A1* | 12/2014 | Muller | H01H 3/20 200/5 A |
| 2015/0100204 A1* | 4/2015 | Gondo | G06F 3/016 701/36 |
| 2015/0130944 A1* | 5/2015 | Hsu | B62J 99/00 348/148 |
| 2015/0151672 A1* | 6/2015 | Hsu | B60Q 1/2615 701/45 |
| 2016/0089072 A1* | 3/2016 | Tetsuka | A61B 5/7455 73/862.321 |
| 2016/0144918 A1* | 5/2016 | Lee | B62H 5/20 362/473 |
| 2017/0073040 A1* | 3/2017 | Djakovic | B62M 6/45 |
| 2017/0320533 A1* | 11/2017 | Hayashi | F16F 15/08 |
| 2018/0251184 A1 | 9/2018 | Durdevic et al. | |
| 2018/0251188 A1 | 9/2018 | Durdevic et al. | |
| 2018/0362106 A1* | 12/2018 | Miles | B62J 1/08 |

FOREIGN PATENT DOCUMENTS

| | | |
|---|---|---|
| CN | 201287793 Y | 8/2009 |
| CN | 102233932 A | 11/2011 |
| CN | 202320636 U | 7/2012 |
| CN | 202429321 | 9/2012 |
| CN | 102741116 A | 10/2012 |
| CN | 202716986 U | 2/2013 |
| CN | 202911871 U | 5/2013 |
| CN | 103661769 A | 3/2014 |
| CN | 203958429 U | 11/2014 |
| CN | 204077923 U | 1/2015 |
| CN | 104516642 A | 4/2015 |
| DE | 29922486 U1 | 5/2000 |
| DE | 10 2006 032016 A1 | 1/2008 |
| DE | 10 2007 040738 A1 | 3/2009 |
| DE | 10 2010 039860 A1 | 3/2012 |
| DE | 20 2012 104592 U1 | 2/2013 |
| DE | 10 2012 200597 A1 | 7/2013 |
| DE | 20 2012 007991 U1 | 12/2013 |
| DE | 20 2013 002491 U1 | 6/2014 |
| DE | 20 2007 019659 U1 | 4/2015 |
| EP | 1342654 A2 | 9/2003 |
| EP | 2581296 A1 | 4/2013 |
| EP | 2868563 A1 | 5/2015 |
| EP | 2868564 A1 | 5/2015 |
| JP | 2015 044463 A | 3/2015 |
| KR | 2011 0114962 A | 10/2011 |
| KR | 2013 0013115 A | 2/2013 |
| TW | 201524838 A | 7/2015 |

(56) References Cited

FOREIGN PATENT DOCUMENTS

| WO | WO 2011/081359 A2 | 7/2011 |
| WO | WO 2017/032832 A1 | 3/2017 |
| WO | WO 2017/032833 A1 | 3/2017 |

OTHER PUBLICATIONS

German Office Action for Application No. 10 2015 216 186.2 dated May 19, 2016.
German Office Action for Application No. 10 2015 216 188.9 dated May 24, 2016.
English International Preliminary Examination Report and Written Opinion for Application No. PCT/EP2016/070081 dated Feb. 27, 2018.
English International Preliminary Examination Report and Written Opinion for Application No. PCT/EP2016/070082 dated Feb. 27, 2018.
English International Preliminary Examination Report and Written Opinion for Application No. PCT/EP2016/070085 dated Feb. 27, 2018.
Non-Final Office Action for U.S. Appl. No. 15/905,142 dated Sep. 25, 2018.
Final Office Action for U.S. Appl. No. 15/905,142 dated Feb. 5, 2019.
Non-Final Office Action for U.S. Appl. No. 15/905,142 dated Jun. 12, 2019.
Non-Final Office for U.S. Appl. NO. 15/905,124 dated Oct. 2, 2019.
Chinese Office Action for Application No. 201680061756.4 dated Jul. 2, 2019.
Chinese Office Action for Application No. 201680061787 dated Jul. 3, 2019.
Chinese Office Action for Application No. 201680061688.1 dated Jul. 10, 2019.
International Search Report with German Written Opinion for Application No. PCT/EP2016/070081 dated Nov. 18, 2016.
International Search Report with German Written Opinion for Application No. PCT/EP2016/070082 dated Nov. 18, 2016.
International Search Report with German Written Opinion for Application No. PCT/EP2016/070085 dated Nov. 18, 2016.
European Office Action for Application No. 16757869.9 dated Oct. 30, 2019.
European Office Action for Application No. 16759723.6 dated Oct. 30, 2019.
Notice of Allowance for U.S. Appl. No. 15/905,142 dated Jan. 10, 2020.
Chinese Office Action for Application No. 201680061787 dated Mar. 5, 2020.
Chinese Office Action for Application No. 201680061688.1 dated Mar. 30, 2020.
Final Office Action for U.S. Appl. No. 15/905,124 dated Apr. 9, 2020.

* cited by examiner

REMOTE CONTROL UNIT AND ELECTRIC BICYCLE

CROSS-REFERENCE TO RELATED APPLICATIONS

This application is a continuation of and claims priority to PCT/EP2016/070085 filed Aug. 25, 2016, which claims the benefit of and priority to German Patent Application Nos. DE 10 2015 216 178.1, DE 10 2015 216 186.2 and DE 10 2015 216 188.9, each filed Aug. 25, 2015, the entire disclosures of which are incorporated by reference herein.

TECHNICAL FIELD

The present disclosure relates to a remote control unit and to an electric bicycle according to the disclosure herein.

BACKGROUND

Electric bicycles, such as pedelecs or e-bikes, enjoy great popularity as an easy-to-use, emission-free means of transportation. Particularly suitable types of bicycles are available for different fields of application. These include, inter alia, bicycles optimized for leisure time use or for the way to work, on the road or in light terrain (for example, city bikes or touring bikes,) and e-mountain bikes (E-MTB), which have been developed in various designs for off-road use and especially for mountainous terrain. Electric bicycles offer the possibility to increase the operating radius without overstraining the rider and to increase the average driving speed.

Electric bicycles are known from the prior art, which in addition to a drive unit and a battery unit also have a display unit and a remote control unit for the display unit. The remote control unit is situated in the region of a handlebar grip remote from the display unit and is provided with assistance selection keys for the choice of the support level of the electric drive. Furthermore, the remote control unit has an input device for menu navigation and selection of menu items shown on the display unit. A disadvantage of such remote control units is that the frequently used assistance selection keys and the input device are situated next to one another and, for this reason, are not ergonomically operatable by the thumb of the rider. Often, a safety-critical repositioning of the hands of the rider to operate the input device is necessary.

SUMMARY

For this reason, an object of the present disclosure is to provide a novel remote control unit, which aligns electrically assisted mobility with the demands of athletic and lifestyle-oriented cyclists.

This object is achieved by a remote control unit and by an electric bicycle having features disclosed herein.

A remote control unit for the display unit of a bicycle according to the present disclosure is situated in the region of a handlebar grip remote from the display unit and has assistance selection keys for the selection of the assistance level and has at least one input device for the menu navigation and selection of menu items shown on the display unit. According to the present disclosure, an input unit and an assistance selection key are situated along a common line. The common line can be multi-dimensionally curved in an ergonomically arcuate manner. The input device and the keys are preferably situated one below the other in such a manner that they are ergonomically operable by the thumb of the rider. A safety-critical repositioning of the hands of the rider is not required for operating the assistance selection keys and the input device.

In a particularly preferred embodiment of the present disclosure, the input device is configured as a joystick. As a result, the menu navigation and selection of menu items shown on the display unit can be carried out intuitively and ergonomically, preferably by the thumb of the rider.

The joystick is preferably movable in all four directions (upward and downward, left and right), the selection/selection of menu items being carried out with the aid of pressure onto the joystick (pressure function). The menu navigation and selection of the menu items is carried out with the multi-functional joystick, so that no further operating elements are required. For this reason, the remote control unit is configured in an extremely compact and aesthetically pleasing manner. The joystick may have a backlit symbol, in particular a rectangle having rounded corners.

It has proven to be particularly advantageous if the assistance selection keys are situated in an inclined manner to one another. In this instance, the selection of the assistance level may be carried out by the thumb of the rider. The assistance selection keys preferably form a concave section. The thumb can rest between the keys situated one above the other so that the operation is carried out intuitively, the assistance selection key for increasing the assistance level preferably being situated in the front in the direction of travel and the assistance selection key for reducing the assistance level in the rear in the direction of travel.

Furthermore, it is preferable that the assistance selection keys are inclined toward the hand of the rider. The operation can be carried out ergonomically preferably by the thumb of the rider.

The assistance selection key for increasing the assistance level is preferably marked with a plus symbol and the assistance selection key for reducing the assistance level is preferably marked with a minus symbol. The symbols are preferably backlit and, for this reason, recognizable even in conditions of poor visibility.

Regarding manufacturing technology and operation, it has proven advantageous if the assistance selection keys have a free actuation section facing the hand of the rider and an elastically mounted end section.

According to a preferred embodiment of the present disclosure, a light switch is offset to the side in the area between the assistance selection keys. Preferably, the light switch is situated in the direction remote from the hand of the rider next to the assistance selection keys. It has proven to be particularly ergonomic if the light switch is situated laterally offset in the middle between the assistance selection keys.

Preferably, the light switch has three functions, each of which are activated sequentially by pressing a key: keep key pressed (>2s), light on/off; push key, dipped beam, push key for the second time, light lights up. As a result, advantageously there is one button for light on/low/high/off. The light switch may have a backlit light symbol.

In electric bicycles having an electronic gearshift of the geared motor, the remote control unit preferably has a centrally mounted rocker switch for gear selection along a pivot axis. According to the present disclosure, it is advantageous if the rocker switch has two actuation surfaces, a first actuation surface being situated on a side facing the hand of the rider and a second actuation surface being situated on a side facing away from the hand of the rider. Preferably, input device, assistance selection keys and rocker switch are situated along a common line. The keys are preferably situated one below the other in such a manner that they are ergonomically operable by the thumb of the rider. A safety-critical repositioning of the hands of the rider is not required for operating the assistance selection keys and the rocker switch.

In a preferred embodiment of the remote control unit, the remote control unit has an upper part and a modularly exchangeable lower part, the rocker switch being assigned to the lower part. For this reason, the remote control unit is modularly adaptable to bicycles with and without an electric geared motor. For this purpose, a lower part designed as a clamp half is mounted with or without a rocker switch. A fastening portion of the upper part and of the lower part each preferably engages around one half of the handlebar. The upper part and lower part are preferably electrically connected with the aid of a flexible band.

The rocker switch preferably has an approximately centrally situated automatic key. The automatic key preferably does not rock and activates the automatic gear selection. For example, it activates the first or second gear of the geared motor.

When viewed in the direction of the handlebar grip axis, the input device, assistance selection keys and rocker switch preferably extend along a convexly arcuate common line, the curvature curve of which is ergonomically adapted to the movement range of the thumb of the rider.

Preferably, the remote control unit has a vibration motor. For example, having reached the highest assistance level can be signaled with the aid of a short vibration. Furthermore, a switching operation can be proposed with the aid of a short vibration. Preferably, a gear proposal is made on the display unit, for example, an upward arrow on the display suggesting to shift up, the vibration alerting the rider that the display unit is displaying new information.

A bicycle according to the present disclosure has a remote control unit for the display unit of the electric bicycle, the remote control unit being situatable in the region of a handlebar grip remote from the display unit and having assistance selection keys for the selection of the assistance level and having at least one input device for the menu navigation and selection of menu items shown on the display unit. According to the present disclosure, input unit and assistance selection keys are situated along a common line. As a result, a particularly ergonomic and safe operation by the rider is enabled.

In a particularly preferable exemplary embodiment of the present disclosure, an electronic control unit, a drive unit and a battery unit are furthermore provided. It has been proven to be particularly advantageous if the electronic control unit is situated in the seat tube of the bicycle frame. As a result, a highly integrated interaction between the frame and the assembly elements is achieved. The design of the battery unit in particular situated in the down tube of the bicycle frame is not limited and more space for the battery cells and thus a high operating distance is available. Because of the thermal decoupling of battery unit and electronic control unit, a high efficiency is achieved. Special battery housings having fastening options for the control unit are not required. Overall, a compact, homogeneous frame shape of highest strength is achieved in this variant. The concept according to the present disclosure therefore also meets the demands of a lifestyle-conscious, ambitiously sportive rider.

It has been proven to be particularly advantageous if the electronic control unit is situated in the lower region of the seat tube adjacent to the drive unit. As a result, the electrical line length is reduced to a minimum. As a result, the electric bicycle has an optimized frame cross-section having constructively and aesthetically best features for optimized space requirements.

In a preferred exemplary embodiment, the electronic control unit is attached to the frame-side drive carrier (motor bracket) of the drive unit. As a result, no further fastening elements are needed. A weight reduction can be achieved.

The electronic control unit is preferably provided with line connections only at an end section facing the drive unit, so that the construction is simplified and the line lengths are minimal. All lines are preferably guided out at the bottom of the frame.

According to a particularly preferred embodiment of the present disclosure, at least one stop, in particular a fastening element of the bottle holder, for example a bottle holder bush, for the seat post is situated above the electronic control unit. As a result, damage to the electronic control unit by a long seat post is prevented.

Preferably, at least one signal line of the remote control unit is connected to the display unit and at least one electrical line of the display unit is connected to the electronic control unit. It has proven to be particularly advantageous if only one bus line is provided between the remote control unit and the display unit. Furthermore, it is particularly advantageous if only one bus line is provided between the display unit and the electronic control unit. The number of cables to be laid, and thus weight and assembly costs, are therefore minimized.

It is particularly advantageous if the brake signal lines are connected directly to the display unit. As a result, only one electrical line between the electronic control unit and the display unit is required. The number of lines is reduced. When the brake is applied, the brake light is activated.

Accordingly, it is preferable if the remote control unit is connected to the display unit by a single bus cable including a plurality of signal lines.

According to a particularly preferred embodiment of the present disclosure, sensor lines are each connected directly to the electronic control unit. In this instance, the number of lines is also reduced. In particular, the following may be provided: a sensor of the kickstand (safety deactivation when the stand is folded down), a sensor of the gearing, acceleration sensors (3D gyro and accelerometer), a sensor for detecting a bicycle folding in folding bikes, pressure sensors and temperature sensors.

The communication is preferably carried out with the aid of CAN bus methods, particularly preferably by CAN open methods. A CAN translator is provided for adaptation requirements.

The present disclosure can be used universally in all types of bicycles, especially in mountain bikes (both in hardtail or full-suspension design), but also can be implemented in other bicycles, for example, road bike frames and, thus, ultimately resulting in a touring, city or cross-bike or other modern types of bicycles. Because of its compact, attractive design, it enables the construction of bikes which largely combine the advantages of a classic bicycle and an electric bicycle.

BRIEF DESCRIPTION OF THE DRAWINGS

A preferred embodiment of the present disclosure is subsequently explained in greater detail in reference to the appended drawings. For this purpose, in detail.

DETAILED DESCRIPTION

Figure 1:
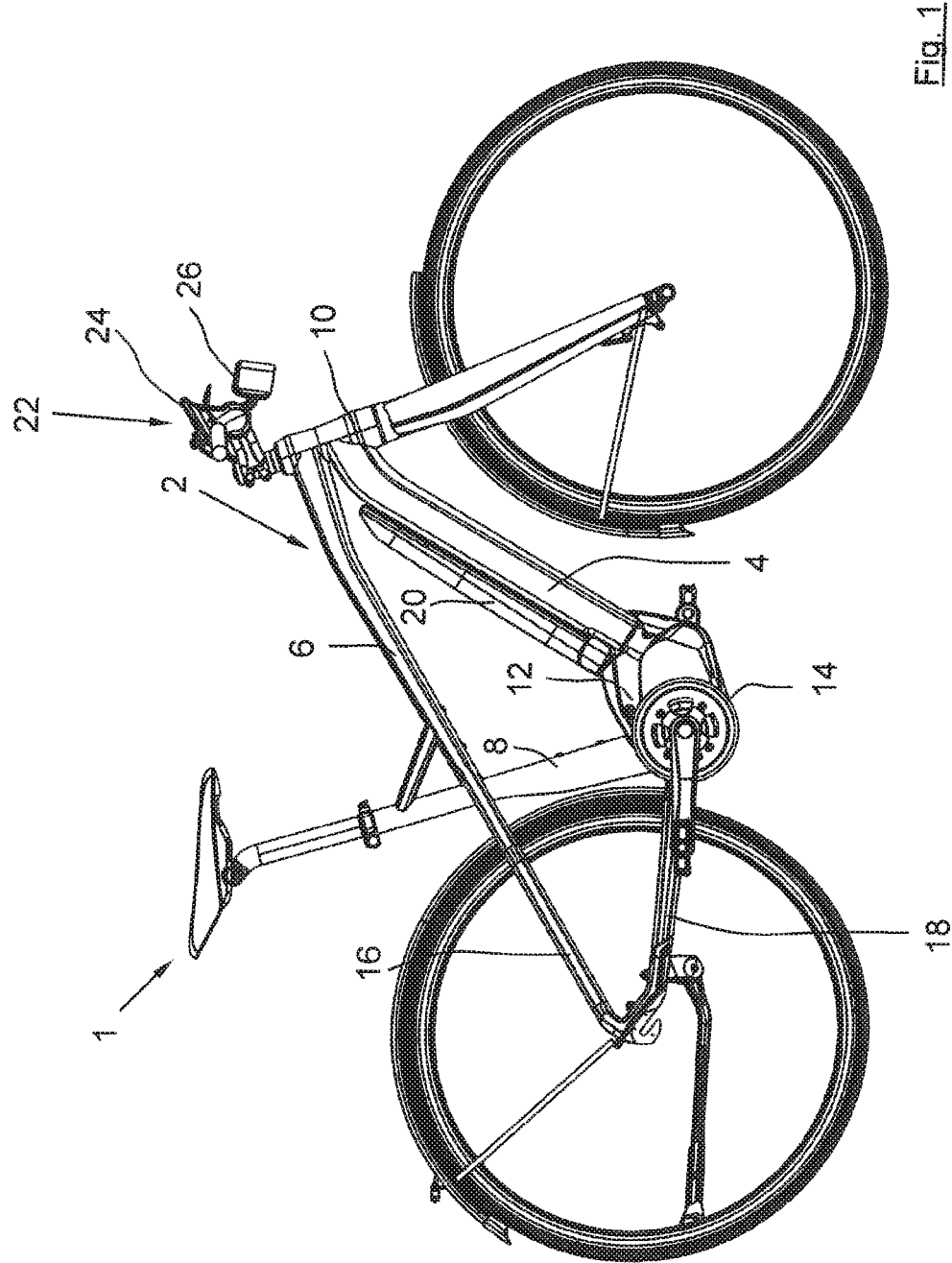
FIG. 1 shows a side view of the electric bicycle according to the present disclosure.

FIG. 1 shows a side view of an electric bicycle 1 according to the present disclosure, having an exemplary bicycle frame 2 configured as a diamond frame, having a down tube 4, a top tube 6, a seat tube 8, a head tube 10, a drive carrier 12 for a drive unit 14 and seat struts 16 and lower struts 18, as well as a battery unit 20.

Figure 2:
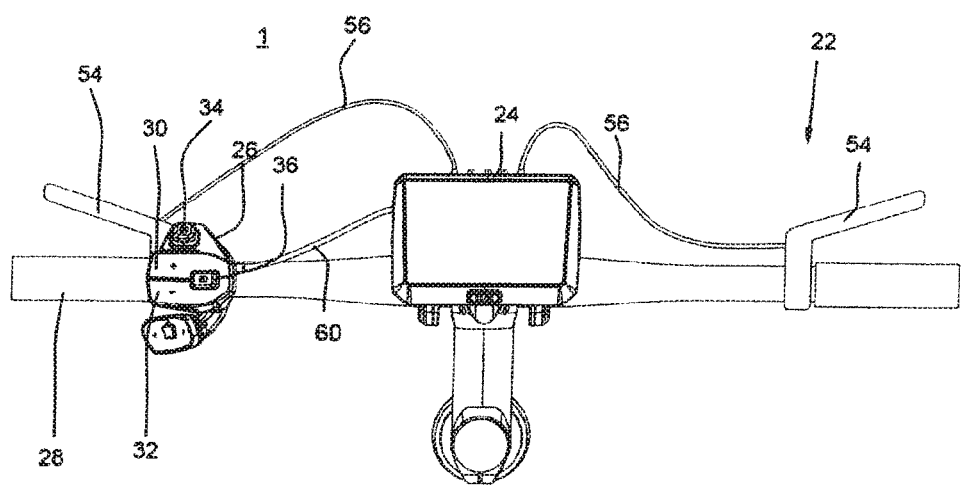
FIG. 2 shows a detailed view of the electric bicycle from FIG. 1 in the region of the handlebar.

As in particular can be concluded from FIG. 2, which shows a detailed representation of electric bicycle 1 from FIG. 1 in the region of handlebar 22, a display unit 24 situated centrally on handlebar 22 and a remote control unit 26 are provided. Remote control unit 26 is situated in the region of a left handlebar grip 28 remote from display unit 24 and has two assistance selection keys 30, 32 for the selection of the motor assistance level, and an input device designed as a joystick 34 for menu navigation and selection of menu items displayed on display unit 24.

Figure 3:
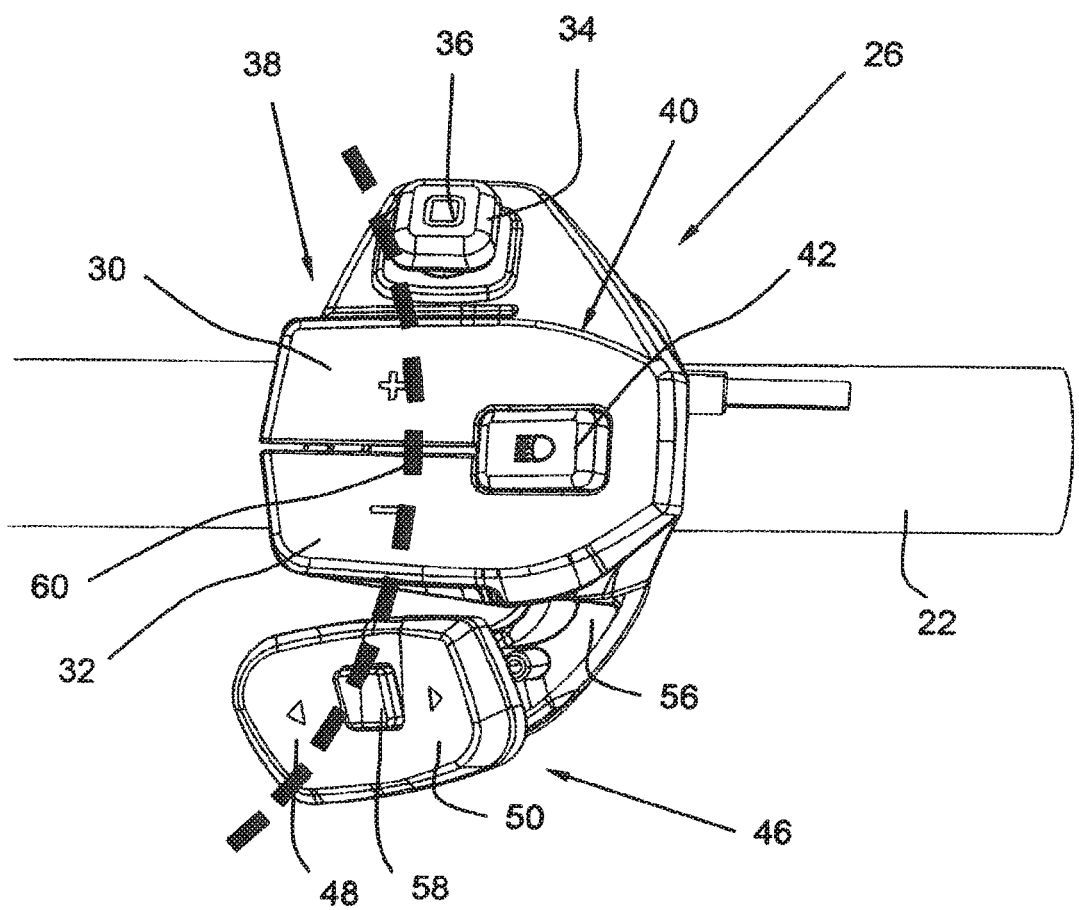
FIG. 3 shows a detailed view of the remote control unit at the handlebar.

According to FIG. 3, which shows a detailed view of remote control unit 26 on handlebar 22, input device 34 and support selection buttons 30, 32 are situated along a common line 60. Joystick 34 and keys 30, 32 are situated one below the other in such a manner that they are ergonomically operatable by the thumb of the rider. A safety-critical repositioning of the hands of the rider is not required to operate support selection buttons 30, 32 and joystick 34.

Joystick 34 is preferably configured as a square having mushroom-like rounded edges and is movable in all four directions (upward and downward, left and right), the selection/selection of menu items being carried out with the aid of pressure onto joystick 34 (pressure function). The menu navigation and selection of menu items is carried out with multi-functional joystick 34, so that no further operating elements are required. For this reason, remote control unit 26 is configured in an extremely compact and aesthetically pleasing manner. Joystick 34 has a frame-like, backlit symbol 36, in particular a rectangle having rounded corners.

Figure 4:
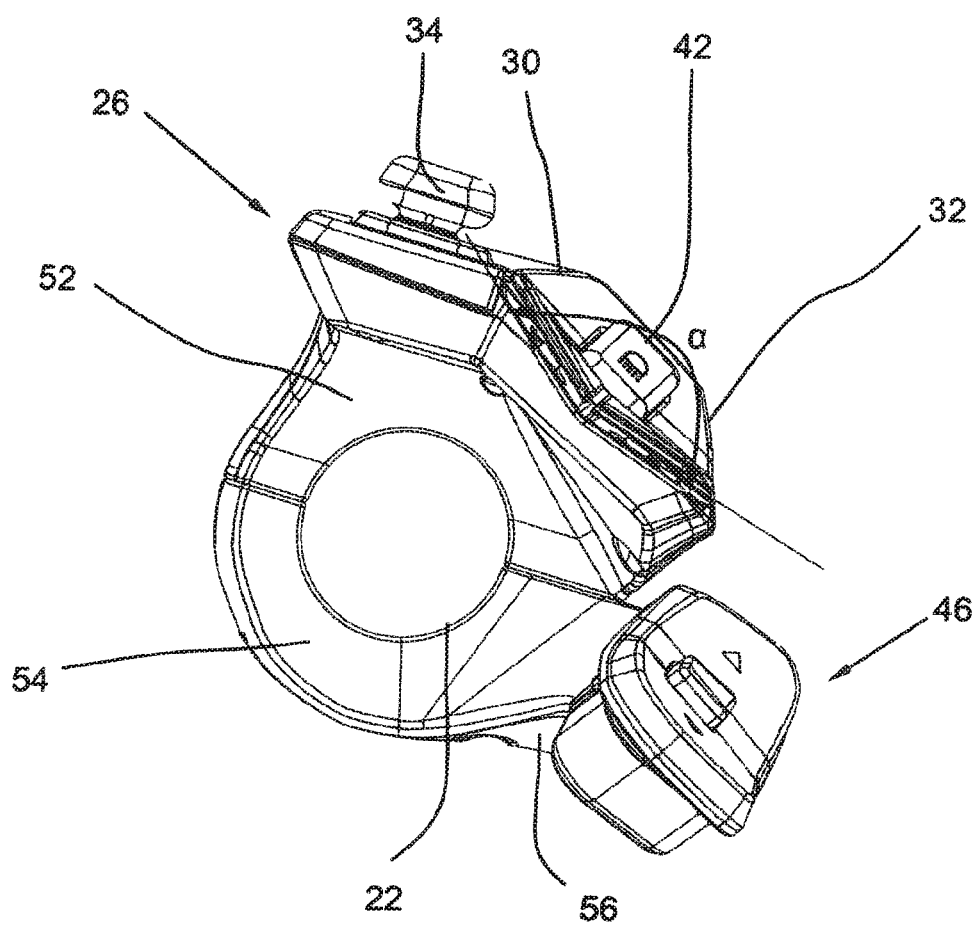
FIG. 4 shows a side view of the remote control unit at the handlebar.

As can be particularly concluded From FIG. 4, which shows a side view of remote control unit 26 at handlebar 22, assistance selection keys 30, 32 are situated in an inclined manner to each other under an angle α in the range of approximately 120° to 170°, preferably of approximately 155°. In this instance, the selection of the assistance level may be carried out by the thumb of the rider. Assistance selection keys 30, 32 preferably form a concave section. The thumb can rest between keys 30, 32 situated one above the other so that the operation is carried out intuitively, assistance selection key 30 for increasing the assistance level preferably being situated in the front in the direction of travel and assistance selection key 32 for reducing the assistance level being situated in the rear in the direction of travel and below. Furthermore, assistance selection keys 30, 32 are situated in a downward inclined manner in the direction of the hand of the rider. The operation can be carried out ergonomically preferably by the thumb of the rider.

Assistance selection key 30 for increasing the assistance level is marked with a plus symbol and assistance selection key 32 for reducing the assistance level is marked with a minus symbol (compare FIG. 3). The symbols are backlit and, for this reason, recognizable even in conditions of poor visibility.

Regarding manufacturing technology and operation, it has proven advantageous if assistance selection keys 30, 32 of remote control unit 26 have a free actuation section 38 facing the hand of the rider and a common elastically configured end section 40.

Furthermore, remote control unit 26 has a wide-format, rectangular light switch 42 which is centrally situated and laterally off-set in the region between assistance selection keys 30, 32. Light switch 42 is situated in the direction remote from the hand of the rider adjacent to assistance selection keys 30, 32 in the region of their end sections 40.

Preferably, light switch 42 has three functions, each of which are activated sequentially by pressing a key: keep key pressed (>2s), light on/off; push key, dipped beam, push key for the second time, light lights up. As a result, advantageously there is one button for light on/low/high/off. The light switch has a backlit light symbol.

Figure 5:
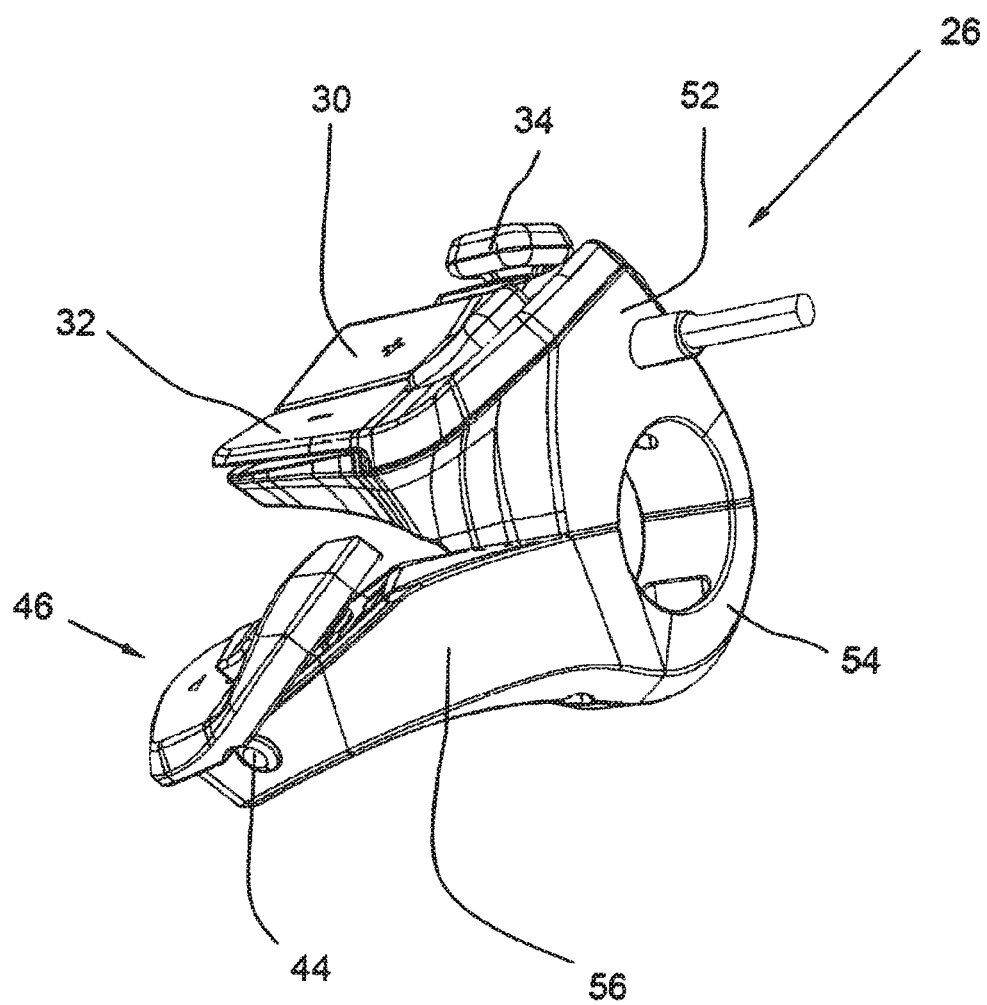
FIG. 5 shows a further detailed view of the remote control unit.

As can be particularly concluded from FIG. 5, which shows a further detailed view of remote control unit 26, the shown electric bicycle is provided with an electronic gearshift of the geared motor, remote control unit 26 having a rocker switch 46 for gear selection centrally mounted along a pivot axis 44.

According to FIG. 3, rocker switch 44 has two actuation surfaces 48, 50, a first actuation surface 48 being situated on a side facing the hand of the rider and a second actuation surface 50 being situated on a side facing away from the hand of the rider. Joystick 36, assistance selection keys 30, 32 and rocker switch 46 are situated along a common line 60. The keys are situated one below the other in such a manner that they are ergonomically operable by the thumb of the rider. A safety-critical repositioning of the hands of the rider is not required to operate support selection buttons 30, 32, joystick 36 and rocker switch 46.

As shown in particular in FIGS. 4 and 5, remote control unit 26 has an upper part 52 and a modularly exchangeable lower part 54, rocker switch 46 being assigned to a support arm 56 of lower part 54, which extends arcuately curved in the direction of the hand of the rider. For this reason, remote control unit 26 is modularly adaptable to bicycles and without an electric geared motor. For this purpose, a lower part designed as a clamp half is mounted with or without a rocker switch. The variation without the rocker switch is not illustrated. In this instance, the support arm is also omitted. Upper part 52 and lower part 54 are electrically connected with the aid of a flex band positioned on the inside (not shown).

Figure 6:
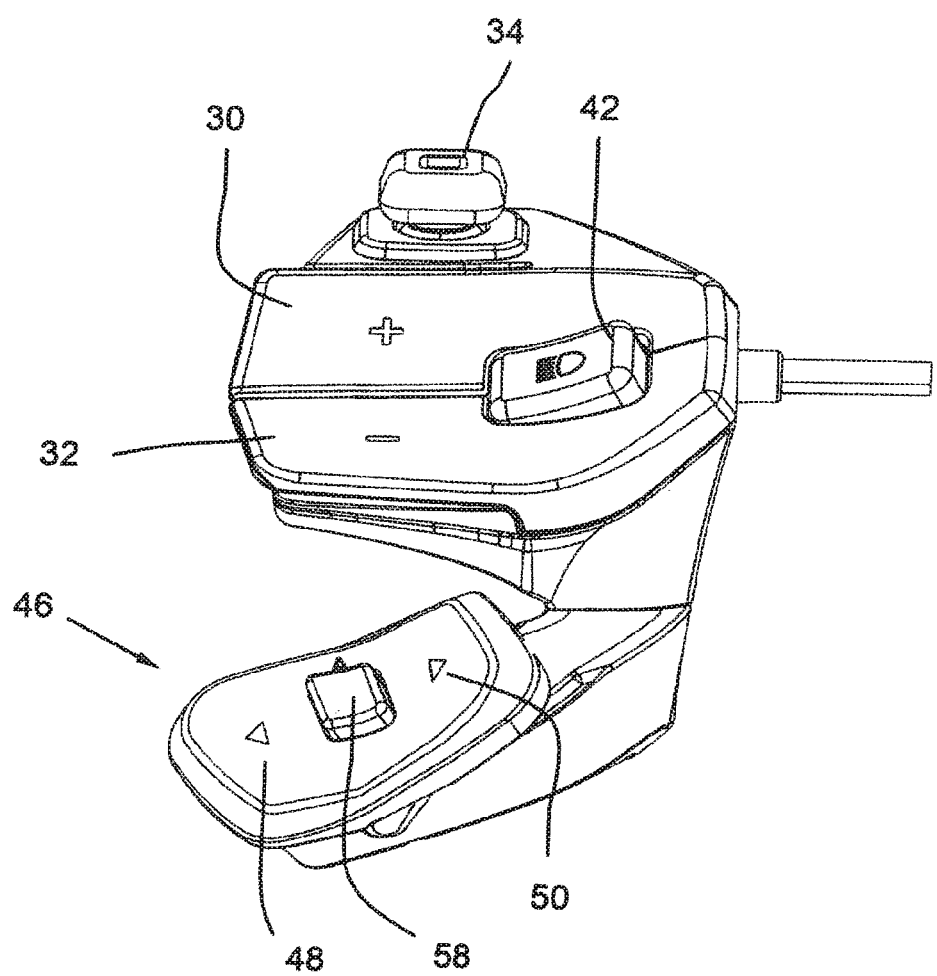
FIG. 6 shows a further detailed view of the remote control unit.

As can be concluded in particular from FIG. 6, which shows a further detailed illustration of remote control unit 26, rocker switch 46 has an approximately centrally situated, square automatic key 58. Automatic key 58 preferably does not rock with rocker switch 46 and activates the automatic gear selection.

When viewed in the direction of the handlebar grip axis, joystick 34, assistance selection keys 30, 32 and rocker switch 46 together extend along a convexly arcuate common line 60 (the dotted line in FIG. 5), the curvature curve of which is ergonomically adapted to the movement range of the thumb of the rider.

The present disclosure can be used universally in all types of bicycles, especially in mountain bikes (both in hardtail or full-suspension design), but also can be implemented in other bicycles, for example, road bike frames and, thus, ultimately resulting in a touring, city or cross-bike or other modern types of bicycles. Because of its compact, attractive design, it enables the construction of bikes which largely combine the advantages of a classic bicycle and an electric bicycle.

The embodiment of the present disclosure is not limited to the examples shown in the figures and as explained above, but is possible in a plurality of modifications by those skilled in the art.

Disclosed is a remote control unit 26 for display unit 24 of an electric bicycle 1, remote control unit 26 being situated in the region of a handlebar grip 28 remote from display unit 24 and having assistance selection keys 30, 32 for the selection of the assistance level and having at least one input device 34 for the menu navigation and selection of menu items shown on display unit 24. According to the present disclosure, input unit 34 and assistance selection keys 30, 32 together are situated along a common line 60. Furthermore disclosed is an electric bicycle 1 including such a remote control unit 26.

LIST OF REFERENCE CHARACTERS 1 electric bicycle
2 bicycle frame
4 down tube
6 top tube
8 seat tube
10 head tube
12 drive carrier
14 drive unit
16 seat strut
18 lower strut
20 battery unit
22 handlebar
24 display unit
26 remote control unit
28 left handlebar grip
30 assistance selection key
32 assistance selection key
34 joystick
36 symbol
38 actuation section
40 end section
42 light switch
44 pivot axis
46 rocker switch
48 actuation surface
50 actuation surface
52 upper part
54 lower part
56 support arm
58 automatic key
60 line

The invention claimed is:

1. A remote control unit for a display unit of an electric bicycle, wherein the remote control unit is situated in a region of a handlebar grip remote from the display unit and comprises assistance selection keys for selection of assistance level and at least one input device for menu navigation and selection of menu items shown on the display unit, wherein, when viewed in the direction of a handlebar grip axis of the handlebar grip, the at least one input device and assistance selection keys are situated along a convexly arcuate common line,
    wherein a curvature curve of the convexly arcuate common line is ergonomically adapted to a movement range of a thumb of a rider of the electric bicycle; and
    wherein the assistance selection keys are situated in an inclined manner toward each other and wherein the assistance selection keys are inclined away from the handlebar grip such that the assistance selection keys form a concave section for the thumb of the rider.

2. The remote control unit of claim 1, wherein the at least one input device is configured as a joystick.

3. The remote control unit of claim 2, wherein the joystick is movable in four directions and choice or selection of menu items can be carried out with pressure onto the joystick.

4. The remote control unit of claim 1, wherein a first assistance selection key for increasing the assistance level is situated in a front in a direction of travel and a second assistance selection key for decreasing the assistance level is situated in a rear of the direction of travel and below the first assistance selection key, and wherein the input device is located on the convexly arcuate common line above both the first assistance selection key and the second assistance selection key.

5. The remote control unit of claim 1, wherein the assistance selection keys have a free actuation section and an elastically configured end section.

6. The remote control unit of claim 1, wherein a light switch is situated laterally off-set in a region between the assistance selection keys.

7. The remote control unit of claim 6, wherein the light switch has a plurality of functions, which can be sequentially activated by touch of a button.

8. The remote control unit of claim 1, comprising a rocker switch for gear selection, mounted centrally along a pivot axis.

9. The remote control unit of claim 8, comprising an upper part and a modularly exchangeable lower part, wherein the rocker switch is assigned to the lower part.

10. The remote control unit of claim 8, wherein the rocker switch has an approximately centrally situated automatic key.

11. The remote control unit of claim 1, wherein the remote control unit has a vibration motor.

12. An electric bicycle comprising a remote control unit for a display unit of the electric bicycle, wherein the remote control unit is situated in a region of a handlebar grip remote from the display unit and comprises assistance selection keys for selection of assistance level and at least one input device for menu navigation and selection of menu items shown on the display unit, wherein, when viewed in the direction of a handlebar grip axis of the handlebar grip, the at least one input device and assistance selection keys are situated along a convexly arcuate common line,
    wherein a curvature curve of the convexly arcuate common line is ergonomically adapted to a movement range of a thumb of a rider of the electric bicycle; and
    wherein the assistance selection keys are situated in an inclined manner toward each other and wherein the assistance selection keys are inclined away from the handlebar grip such that the assistance selection keys form a concave section for the thumb of the rider.

* * * * *